US011524701B2

(12) United States Patent
McGill et al.

(10) Patent No.: US 11,524,701 B2
(45) Date of Patent: Dec. 13, 2022

(54) METHODS AND SYSTEMS OF PREDICTING ROAD AGENT BEHAVIOR USING VOXEL GRIDS

(71) Applicant: Toyota Research Institute, Inc., Los Altos, CA (US)

(72) Inventors: Stephen G. McGill, Broomall, PA (US); Paul Drews, Watertown, MA (US); Guy Rosman, Newton, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 333 days.

(21) Appl. No.: 16/834,233

(22) Filed: Mar. 30, 2020

(65) Prior Publication Data
US 2021/0300424 A1    Sep. 30, 2021

(51) Int. Cl.
| | | |
|---|---|---|
| *B60W 60/00* | (2020.01) | |
| *G05D 1/00* | (2006.01) | |
| *G05D 1/02* | (2020.01) | |
| *B60W 30/18* | (2012.01) | |
| *B60W 40/06* | (2012.01) | |
| *G05B 13/02* | (2006.01) | |
| *G06N 3/08* | (2006.01) | |

(Continued)

(52) U.S. Cl.
CPC .. *B60W 60/0025* (2020.02); *B60W 30/18163* (2013.01); *B60W 40/04* (2013.01); *B60W 40/06* (2013.01); *G05B 13/027* (2013.01); *G05D 1/0088* (2013.01); *G05D 1/0221* (2013.01); *G06N 3/0472* (2013.01); *G06N 3/08* (2013.01); *B60W 2552/00* (2020.02); *G05D 2201/0213* (2013.01)

(58) Field of Classification Search
CPC ....... B60W 60/0025; B60W 30/18163; B60W 40/04; B60W 40/06; B60W 2552/00; G05B 13/027; G05D 1/0088; G05D 1/0221; G05D 2201/0213; G06N 3/0472; G06N 3/08; G06N 3/088
See application file for complete search history.

(56) References Cited

U.S. PATENT DOCUMENTS

| | | | |
|---|---|---|---|
| 9,476,730 B2 | 10/2016 | Samarasekera et al. | |
| 10,354,150 B2 * | 7/2019 | Yamazaki | ............ H04N 13/254 |

(Continued)

OTHER PUBLICATIONS

Daniel Maturana and Sebastian Scherer, "VoxNet: A 3D Convolutional Neural Network for Real-Time Object Recognition", Jan. 15, 2020, 7 pages, https://www.ri.cmu.edu/pub_files/2015/9/voxnet_maturana_scherer_i ros15.pdf.

(Continued)

*Primary Examiner* — Thomas Ingram
(74) *Attorney, Agent, or Firm* — Dinsmore & Shohl LLP

(57) ABSTRACT

A method includes encapsulating a current state of a road portion into a voxel grid, a first dimension of the voxel grid being associated with a first spatial dimension of the road portion, a second dimension of the voxel grid being associated with a second spatial dimension of the road portion, and a third dimension of the voxel grid comprising a plurality of feature layers, wherein each feature layer is associated with a feature of the road portion. The voxel grid may be input into a trained neural network and a future state of the road portion may be predicted based on an output of the neural network.

20 Claims, 8 Drawing Sheets

(51) Int. Cl.
*G06N 3/04* (2006.01)
*B60W 40/04* (2006.01)

(56) References Cited

U.S. PATENT DOCUMENTS

| | | | |
|---|---|---|---|
| 10,514,462 B2 * | 12/2019 | Englard | G01S 7/4972 |
| 2018/0189578 A1 | 7/2018 | Yang et al. | |
| 2019/0147250 A1 | 5/2019 | Zhang et al. | |
| 2019/0162856 A1 | 5/2019 | Atalla | |
| 2019/0188541 A1 | 6/2019 | Wang et al. | |
| 2019/0279049 A1 * | 9/2019 | Doria | G06V 20/56 |
| 2020/0058156 A1 * | 2/2020 | Tran | G06V 10/82 |
| 2020/0410751 A1 * | 12/2020 | Omari | G06V 20/58 |

OTHER PUBLICATIONS

Jun Xu et al., "3D-GIoU: 3D Generalized Intersection Over Union for Object Detection in Point Cloud", Sep. 22, 2019, 16 pages, https://www.researchgate.net/publication/335980785_3DGIoU_3D_Generalized_Intersection_over_Union_for_Object_Detection_in_Point_Cloud#pf8.

* cited by examiner

METHODS AND SYSTEMS OF PREDICTING ROAD AGENT BEHAVIOR USING VOXEL GRIDS

TECHNICAL FIELD

The present specification relates to predicting a state of a road portion based on a voxel grid, and more particularly, to methods and systems of predicting road agent behavior using voxel grids.

BACKGROUND

Autonomous vehicles navigate and self-drive by collecting data from sensors to determine their environment. Sensor data may be used to detect the presence of road agents, such as pedestrians and other vehicles on the road. Autonomous vehicles may then perform various driving maneuvers accordingly to account for the presence of other road agents. However, road agents are rarely stationary and typically move dynamically. Thus, an autonomous vehicle may be able to perform better and more efficient driving maneuvers if they are able to predict the behavior of other road agents. Accordingly, a need exists for methods and systems of predicting the behavior of road agents.

SUMMARY

In one embodiment, a method may include encapsulating a current state of a road portion into a voxel grid, inputting the voxel grid into a trained neural network, and predicting a future state of the road portion based on an output of the neural network. A first dimension of the voxel grid may be associated with a first spatial dimension of the road portion. A second dimension of the voxel grid may be associated with a second spatial dimension of the road portion. A third dimension of the voxel grid may comprise a plurality of feature layers. Each feature layer may be associated with a feature of the road portion.

In another embodiment, an apparatus may include one or more processors, one or more memory modules, and machine readable instructions stored in the one or more memory modules. When executed by the one or more processors, the instructions may cause the apparatus to encapsulate a current state of a road portion into a voxel grid, input the voxel grid into a trained neural network, and predict a future state of the road portion based on an output of the neural network. A first dimension of the voxel grid may be associated with a first spatial dimension of the road portion. A second dimension of the voxel grid may be associated with a second spatial dimension of the road portion. A third dimension of the voxel grid may comprise a plurality of feature layers. Each feature layer may be associated with a feature of the road portion.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein describe systems and methods for predicting activity of road agents using a voxel grid. Autonomous vehicles typically navigate and perform self-driving by gathering sensor data to detect a surrounding environment including other road agents such as vehicles, pedestrians, and the like. Predicting the behavior of these road agents may allow autonomous vehicles to improve their self-driving performance.

A particular road portion may be modeled as a voxel grid. Two dimensions of the voxel grid may comprise spatial coordinates of the road portion (e.g., x and y coordinates). A third dimension of the voxel grid may comprise a plurality of feature layers associated with various features of the road portion. These features may include whether or not a grid portion is occupied by a road agent, the type of road agent occupying a grid portion, a velocity of a road agent, a direction of a travel of the road agent, and the like. Other features of the voxel grid may include a likelihood of a road agent performing a particular maneuver (e.g., turning or changing lanes).

The road portion may be observed over time using vehicle sensors, traffic cameras, and the like. Features determined from observation of the road portion may be encapsulated in the voxel grid representing a state of the road portion. A plurality of these voxel grids representing various states of a road portion may be input into a neural network or other machine learning model, which may be trained to predict voxel grids representing future states of the road portion and/or future behavior of road agents given a current state of the voxel grid, using either supervised or unsupervised learning techniques. After the neural network is trained, an autonomous vehicle may capture a state of the road portion at a particular time using vehicle sensors or other data, as encapsulated in the voxel grid. The voxel grid may then be input into the trained neural network to predict a voxel grid representing a future state of the voxel grid and/or to predict behavior of road agents. The autonomous vehicle may then utilize the prediction output by the neural network to perform appropriate self-driving maneuvers.

Figure 1:
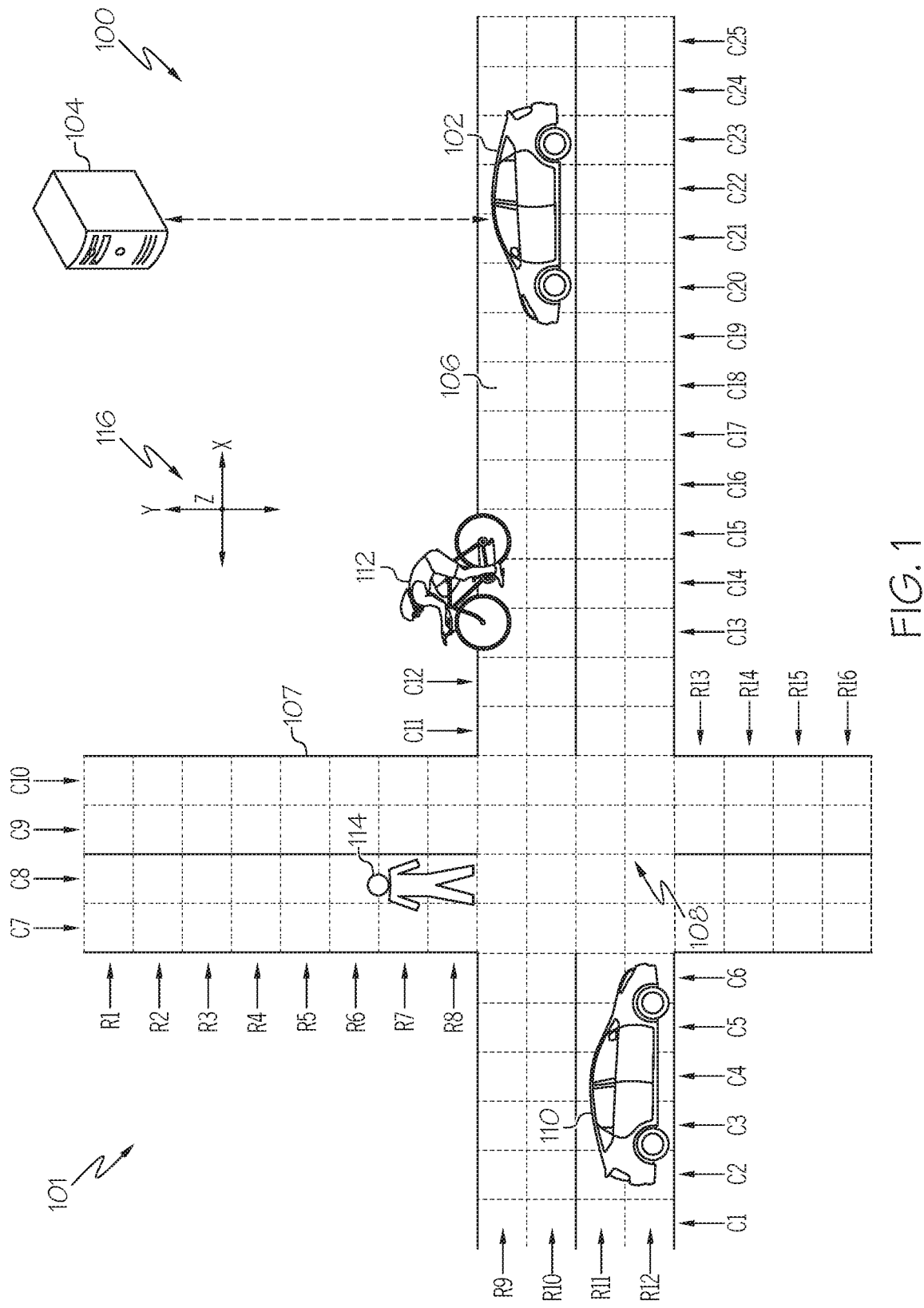
FIG. 1 schematically depicts an example system for predicting road agent behavior using voxel grids, according to one or more embodiments shown and described herein.

FIG. 1 schematically depicts a system 100 for predicting road agent behavior using a voxel grid. The system 100 includes a vehicle 102 and a remote computing device 104. In the illustrated example, the vehicle 102 is an autonomous vehicle driven by computer control. In other examples, the vehicle 102 may be a non-autonomous vehicle driven by a human driver. In the example of FIG. 1, a road portion 101 is shown comprising roads 106 and 107 and an intersection 108 where the roads 106, 107 intersect.

In the example of FIG. 1, the vehicle 102 drives along the road 106 approaching the intersection 108. Another vehicle 110 approaches the intersection 108 from the other side of the road 106, a bicyclist 112 is riding in front of the vehicle 102 on the road 106 and a pedestrian 114 is crossing the road 107. The vehicle 110, the bicyclist 112, and the pedestrian 114 are all road agents whose activity the autonomous vehicle 102 may account for while performing self-driving.

In the example of FIG. 1, a state of the road portion 101 may be encapsulated into a voxel grid. Two of the dimensions of the voxel grid may represent spatial dimensions of the road portion 101, such as x and y dimensions as shown in the legend 116. Thus, the road portion 101 may be divided into a two-dimensional grid, as shown in FIG. 1, with each grid portion having an x-coordinate and a y-coordinate. In the example of FIG. 1, the road portion 101 is divided into sixteen horizontal rows, R1-R16 and twenty-five vertical columns, C1-C25. For example, the pedestrian 114 is positioned in row R8 and column C8.

In some examples, the road portion 101 may divided into a grid comprising 1 meter×1 meter grid portions. In other examples, the road portion 101 may be divided into a grid comprising grid portions of other sizes. In the example of FIG. 1, each grid portion comprises a square. However, in other examples, the road portion 101 may be divided into a grid having grid portions of other shapes. In some examples, the grid may comprise a logarithmic or exponential scale. In other examples, the grid may comprise an unstructured mesh.

In the example of FIG. 1, the road portion 101 comprises a portion of the road 106, a portion of the road 107, and the intersection 108. In other examples, road portions of other sizes and/or shapes may be included in a voxel grid. For example, a voxel grid may comprise an intersection, a straight section of a road, other portions of a road, or any combinations thereof.

The third dimension of the voxel grid may comprise a plurality of feature layers with each feature layer being associated with a particular feature of the road portion 101. Some of these features may be associated with features that can be directly observed using sensor data, such as whether a grid portion is occupied by a road agent or a velocity of a road agent in a grid portion. In some examples, feature layers may be associated with different sensor data (e.g., one feature layer may be associated Radar data and another feature layer may be associated with Lidar data). Other feature layers may be associated with likelihoods of road agent activity (e.g., a probability that a road agent performs a driving maneuver such as a turn or a lane change). Other feature layers may be associated with other features such as a confidence of certain measurements in other feature layers.

Any number of feature layers associated with any number of features may be included in the voxel grid. For example, one layer may comprise occupancy by a vehicle, a second layer may comprise vehicle velocity, a third layer may comprise occupancy by a pedestrian, and a fourth layer may comprise pedestrian velocity. In the example of FIG. 1, each voxel of the voxel grid is defined by a row, a column, and a feature and the voxel contains a value for the feature at that row and column. For example, in FIG. 1, the voxel at row R8, column C8, and feature of pedestrian occupancy would have a value of 1 or TRUE, while the voxel row R7, column C8, and feature of pedestrian occupancy would have a value of 0 or FALSE.

For some feature layers, such as whether a pedestrian is a present, the feature value is a binary value (e.g., TRUE or FALSE). For other feature layers, such as vehicle velocity, the feature value may be an analog or digital value (e.g., 30 miles per hour). For other feature layers, the feature value may be a probability (e.g., 30% probability that a vehicle will execute a lane change). The feature layers of the voxel grid are explained in further detail below.

Figure 2:
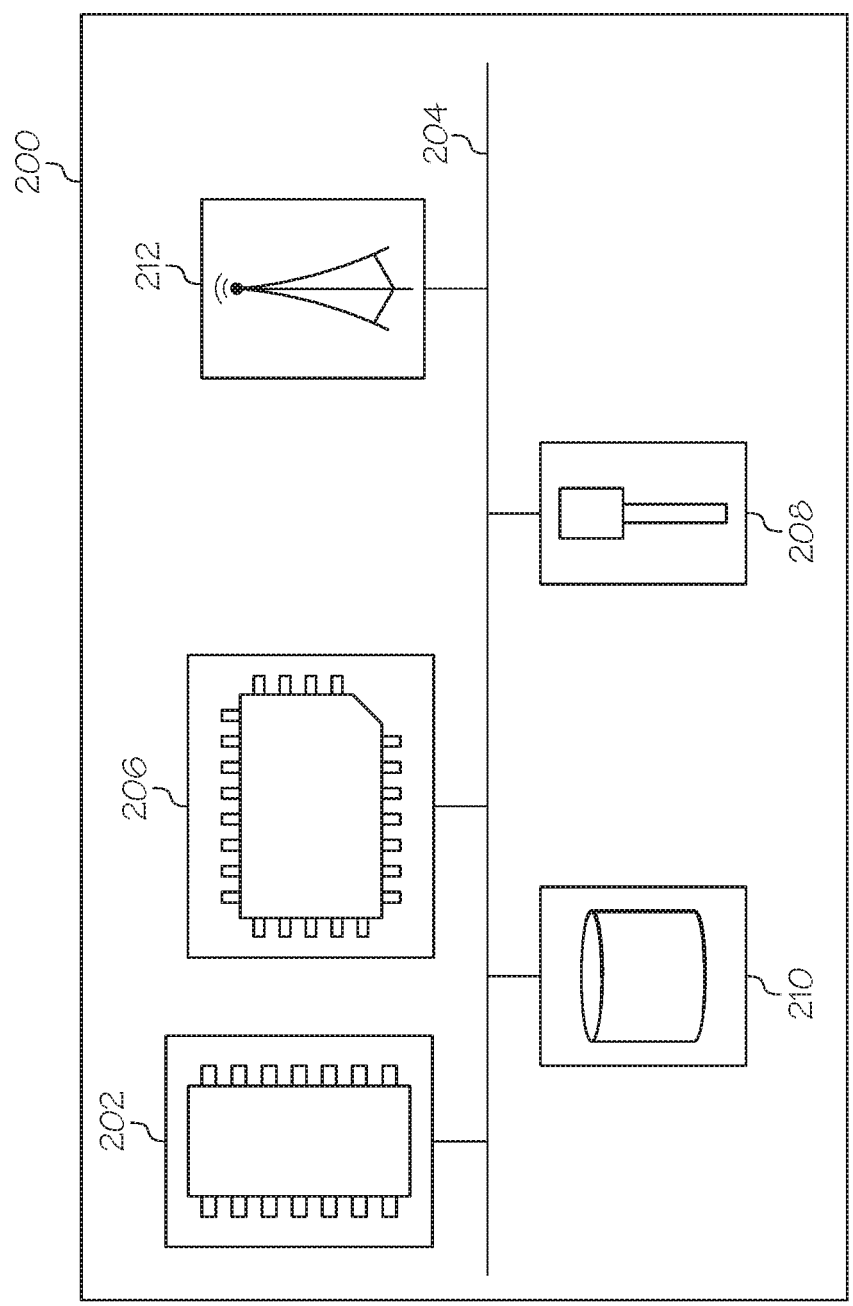
FIG. 2 depicts a schematic diagram of an example vehicle system for predicting road agent behavior using voxel grids, according to one or more embodiments shown and described herein.

FIG. 2 depicts an example vehicle system 200 included in the vehicle 102 of FIG. 1. The vehicle system 200 includes one or more processors 202, a communication path 204, one or more memory modules 206, a satellite antenna 208, one or more vehicle sensors 210, and network interface hardware 212, the details of which will be set forth in the following paragraphs. The vehicle system 200 may also include one or more modules for performing autonomous driving of the vehicle 102. It should be understood that the vehicle system 200 of FIG. 2 is provided for illustrative purposes only, and that other vehicle systems 200 comprising more, fewer, or different components may be utilized.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the vehicle system 200. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 2, the example vehicle system 200 comprises a satellite antenna 208 coupled to the communication path 204 such that the communication path 204 communicatively couples the satellite antenna 208 to other modules of the vehicle system 200. The satellite antenna 208 is configured to receive signals from global positioning system satellites. Specifically, in one embodiment, the satellite antenna 208 includes one or more conductive elements that interact with electromagnetic signals transmitted by global positioning system satellites. The received signal is transformed into a data signal indicative of the location (e.g., latitude and longitude) of the satellite antenna 208 or an object positioned near the satellite antenna 208, by the one or more processors 202. Thus, the satellite antenna 208 allows the vehicle 102 to monitor its location. The vehicle 102 may transmit its location to the remote computing device 104, as explained in further detail below.

The vehicle system 200 comprises one or more vehicle sensors 210. Each of the one or more vehicle sensors 210 is coupled to the communication path 204 and communicatively coupled to the one or more processors 202. The one or more vehicle sensors 210 may include, but are not limited to, Lidar sensors, Radar sensors, optical sensors (e.g., cameras, laser sensors, proximity sensors, location sensors), and the like. The vehicle sensors 210 may be used to navigate the autonomous vehicle 102. In addition, the vehicle sensors 210 may detect information about nearby road agents and/or traffic infrastructure. For example, the vehicle sensors 210 may detect the position and velocities of other road agents (e.g., pedestrians or other vehicles). The vehicle sensors 210 may also detect other information about road agents (e.g., the type of road agent, whether a vehicle turn signal or brake lights are illuminated). The vehicle sensors 210 may also detect traffic infrastructure (e.g., the state of traffic lights). The information detected by the vehicle sensors 210 may be used to train a neural network to predict road agent behavior, as explained in further detail below.

Still referring to FIG. 2, the vehicle system 200 comprises network interface hardware 212 for communicatively coupling the vehicle system 200 to the remote computing device 104 (See FIG. 1). The network interface hardware 212 can be communicatively coupled to the communication path 204 and can be any device capable of transmitting and/or receiving data via a network. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 212 includes hardware configured to operate in accordance with the Bluetooth® wireless communication protocol. The network interface hardware 212 of the vehicle system 200 may transmit information detected by the vehicle sensors 210 to the remote computing device 104. In some examples, the network interface hardware 212 may transmit one or more images captured by the vehicle sensors 210 to the remote computing device 104. In some examples, the network interface hardware 212 may receive data transmitted from the remote computing device 104 that the autonomous vehicle 102 may use to navigate.

In some embodiments, the vehicle system 200 may be communicatively coupled to the remote computing device 104 (See FIG. 1) by a network. In one embodiment, the network may include one or more computer networks (e.g., a personal area network, a local area network, or a wide area network), cellular networks, satellite networks and/or a global positioning system and combinations thereof. Accordingly, the vehicle system 200 can be communicatively coupled to the network via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Figure 3:
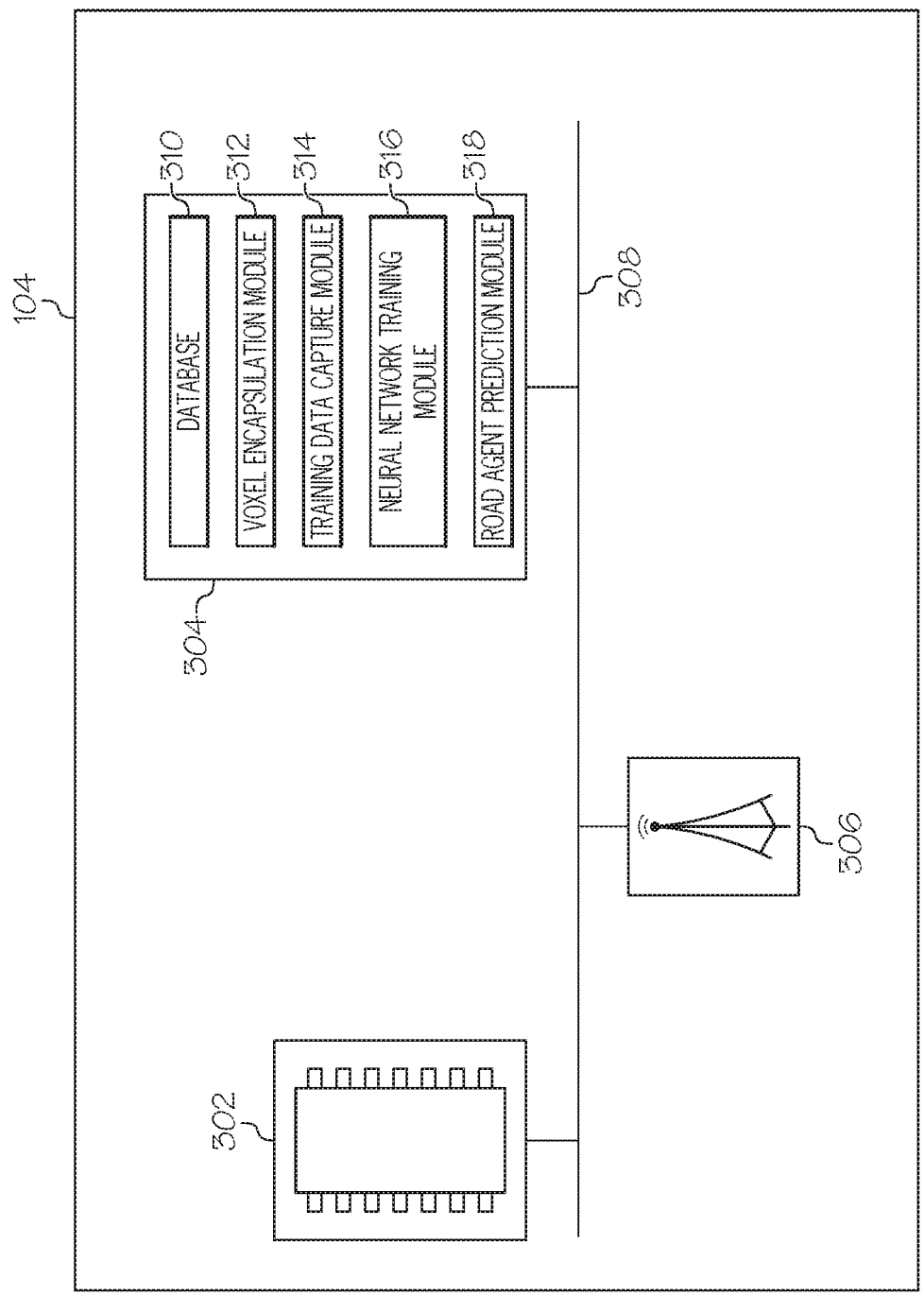
FIG. 3 depicts a schematic diagram of an example computing device for predicting road agent behavior using voxel grids with supervised learning techniques, according to one or more embodiments shown and described herein.

Now referring to FIG. 3, the remote computing device 104 is discussed. The remote computing device 104 may predict road agent behavior using supervised learning techniques as described herein. In other examples, the system 100 of FIG. 1 may utilize a remote computing device 400 to predict road agent behavior using unsupervised learning techniques. This is discussed in connection with FIG. 4.

Referring to FIG. 3, the remote computing device 104 comprises one or more processors 302, one or more memory modules 304, network interface hardware 306, and a communication path 308. The one or more processors 302 may be a controller, an integrated circuit, a microchip, a computer, or any other computing device. The one or more memory modules 304 may comprise RAM, ROM, flash memories, hard drives, or any device capable of storing machine readable and executable instructions such that the machine readable and executable instructions can be accessed by the one or more processors 302. The communication path 308 provides signal interconnectivity between various modules of the remote computing device 104.

The network interface hardware 306 can be communicatively coupled to the communication path 308 and can be any device capable of transmitting and/or receiving data via a network. Accordingly, the network interface hardware 306 can include a communication transceiver for sending and/or receiving any wired or wireless communication. For example, the network interface hardware 306 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 306 includes hardware configured to operate in accordance with the Bluetooth® wireless communication protocol. The network interface hardware 306 of the remote computing device 104 may transmit and receive data to and from the vehicle 102.

The one or more memory modules 304 include a database 310, a voxel encapsulation module 312, a training data capture module 314, a neural network training module 316, and a road agent prediction module 318. Each of the database 310, the voxel encapsulation module 312, the training data capture module 314, the neural network training module 316, and the road agent prediction module 318 may be a program module in the form of operating systems, application program modules, and other program modules stored in one or more memory modules 304. In some embodiments, the program module may be stored in a remote storage device that may communicate with the remote computing device 104. In some embodiments, one or more of the database 310, the voxel encapsulation module 312, the training data capture module 314, the neural network training module 316, and the road agent prediction module 318 may be stored in the one or more memory modules 206 of the vehicle system 200. Such a program module may include, but is not limited to, routines, subroutines, programs, objects, components, data structures and the like for performing specific tasks or executing specific data types as will be described below.

The database 310 may temporarily store data received from the vehicle 102. The data received from the vehicle 102 may include data captured by the vehicle sensors 210. In some examples, the remote computing device 104 may receive data captured by other devices, such as traffic cameras. This information may also be stored in the database 310. The data received from the vehicle 102 and/or other devices may include observed features of the road portion 101 (e.g., occupancy of grid portions by road agents, velocity of road agents, and the like).

In some examples, the database 310 may store features associated with road portions. These stored features may be associated with particular road portions at particular locations at particular times. These features may be encapsulated into voxel grids, as discussed in further detail below. The database 310 may also store neural network parameters, as discussed below.

Referring still to FIG. 3, the voxel encapsulation module 312 may encapsulate features of a road portion into a voxel grid. As explained above, a road portion, such as the road portion 101 of FIG. 1, may be discretized as a voxel grid comprising two spatial dimensions (e.g., a two-dimensional grid having a plurality of grid sections) and a plurality of feature layers. That is, each grid section of a road portion may have a value for each feature associated with a feature layer. As such, a voxel grid may encapsulate a state of a road portion.

In the example of FIG. 3, a voxel grid represents a state of a road portion at a particular time. Each feature layer may be associated with a feature that can either be measured by sensors or determined from sensor measurements. The feature layers may comprise occupancy of grid sections by different road agents, velocities of road agents, direction of travel of road agents, operational states of road agents (e.g., whether a vehicle has a turn signal or brake lights illuminated), and the like. In some examples, a feature layer may comprise a semantic class of a road agent (e.g., whether a road agent is a car, a truck, a motorcycle, a bicycle, or the like). In some examples, a feature layer may comprise an occlusion layer (e.g., whether an occlusion is present at locations of the road portion). In some examples, these features may be determined through other processes (e.g., image processing of an image may be performed to determine locations of vehicles, pedestrians, or other road agents). In some examples, different feature layers may comprise different sensor measurements. For example, one feature layer may comprise data from Lidar sensors, one feature layer may comprise data from Radar measurements, one feature layer may comprise data from image sensors, etc.

In some examples, one or more features may have a probability or confidence associated with them. For example, one voxel may indicate that there is a 90% probability of occupancy by a vehicle. A probabilistic measurement may be given because of measurement uncertainty from sensors or because of uncertainty in algorithms used to identify features. For example, an image analysis algorithm may utilize a neural network or other machine learning model to identify road agents at particular locations on a road portion based on one or more images of the road portion. Rather than identifying road agents with certainty, such algorithms may identify road agents with a certain probability. Thus, this probability of identification may be included as a voxel feature. In some examples, one or more feature layers may be associated with measurement uncertainty or confidence of other feature layers.

The voxel encapsulation module 312 may gather the appropriate feature data for each grid section of a road portion and encapsulate the feature data into a voxel grid. Thus, a voxel grid is a convenient way to encapsulate a state of a road portion at a moment in time. Voxel grids may be associated with a timestamp indicating that the time at which the state of the road portion is encapsulated by the voxel grid (e.g., the time at which sensor data was collected). The sensor data received from the vehicle 102 and other vehicles and/or traffic infrastructure may include a timestamp indicating when the data was collected. The received timestamp may be used to associate a voxel grid with a timestamp. Voxel grids encapsulated by the voxel encapsulation module 312 may be stored in the database 310 and may be utilized by the other memory modules 304, as explained below.

Still referring to FIG. 3, the training data capture module 314 may capture neural network training data. As explained herein, in the example of FIG. 3, a neural network may be used to predict a voxel grid representing a future state of a road portion given a voxel grid representing a current state of the road portion. In other examples, other machine learning models may be used. In the example of FIG. 3, the neural network may be trained using training data comprising a plurality of training examples captured by the training data capture module 314, as explained herein. The neural network may comprise any neural network architecture having any number of hidden layers or other hyperparameters.

In the example of FIG. 3, a training example comprises a first voxel grid representing a state of a road portion at a first time t1, and a second voxel grid representing a state of the road portion at a later time t2. The neural network can then be trained to predict a voxel grid representing a future state of a road portion given a voxel grid representing a current state of the road portion, as explained below.

The training data capture module 314 may capture training examples by pairing voxel grids that have timestamps separated by a desired length of time (e.g., five seconds). The separation in time between the two voxels of a training example may depend on the size of the grid sections in the voxel grid. For example, if the voxel grid comprises 3 m×3 m grid sections, it may be appropriate to use voxel grids representing states of a road portion separated by five seconds as a training example. However, if the voxel grid comprises 1 cm×1 m grid sections, it may be more appropriate to use voxels representing states of a road portion separated by 0.1 seconds as a training example. This is because the larger the grid sections are in the voxel grid, the longer time it will take for a state of a grid section to change. Conversely, if the grid sections of the voxel grid are smaller, changes in grid sections may happen more quickly.

By pairing together two voxel grid separated in time as one training example, the first voxel grid may be input into the neural network as the input layer and the second voxel grid may be a ground truth label. Thus, the neural network may be trained to predict a voxel grid representing a future state of a road portion given a voxel grid representing a current state of the road portion, as explained below.

Still referring to FIG. 3, the neural network training module 316 may train the neural network using techniques disclosed herein. The neural network may be trained utilizing training examples comprising a first voxel grid representing a state of a road portion at a time t1 and a second voxel grid representing a state of the road portion at a later time t2 captured by the training data capture module 314, as explained above. To train the neural network, the neural network training module 316 may input the first voxel grid of a training example, representing a state of a road portion at time t1, into the neural network input layer. In some examples, an image of the road portion associated with the voxel grid may also be input into the neural network. The neural network may then output a voxel grid representing a predicted state of the road portion at time t2. The neural network training module 316 may then calculate a loss value for the training example based on a difference between the predicted voxel grid at time t2 and the ground truth voxel grid at time t2. The loss value may be a difference between the predicted voxel grid values and the ground truth voxel grid values, a squared-error difference between the predicted voxel grid values and the ground truth voxel grid values, or any other function based on a comparison between the predicted values of the voxel grid at time t2 and the ground truth values of the voxel grid at time t2.

After calculating a loss value for each training example, a value of a cost function may then be calculated by combining the loss values for every training example (e.g., taking the average of the loss function for all training examples). The neural network may then be trained to learn parameters that minimize the cost function (e.g., using gradient descent or another optimization algorithm). These learned parameters may then be saved in the database 310.

Still referring to FIG. 3, the road agent prediction module 318 predicts a future state of a voxel grid for a road portion using the trained neural network. As the autonomous vehicle 102 is driving along the road 106, the vehicle sensors 210 may capture sensor data relating to the road portion 101 and transfer the recorded sensor data to the remote computing device 104. The voxel encapsulation module 312 may encapsulate the received sensor data into a voxel grid representing a current state of the road portion 101. The road agent prediction module 318 may then input the voxel grid into the trained neural network and the neural network may output a predicted voxel grid representing a state of the road portion 101 a short time in the future. In some examples, the road agent prediction module 318 may also input an image of a road portion into the trained neural network (e.g., for neural networks that have been trained on images of road portions). By comparing the voxel grid representing a future state of the road portion to the voxel grid representing a current state of the road portion, the vehicle 102 may observe predicted behavior of other road agents (e.g., predicted movements of the vehicle 110, bicyclist 112, and pedestrian 114 in the example of FIG. 1). Thus, the autonomous vehicle 102 may make driving decisions and perform driving maneuvers based on the predicted behavior of the other road agents.

Figure 4:
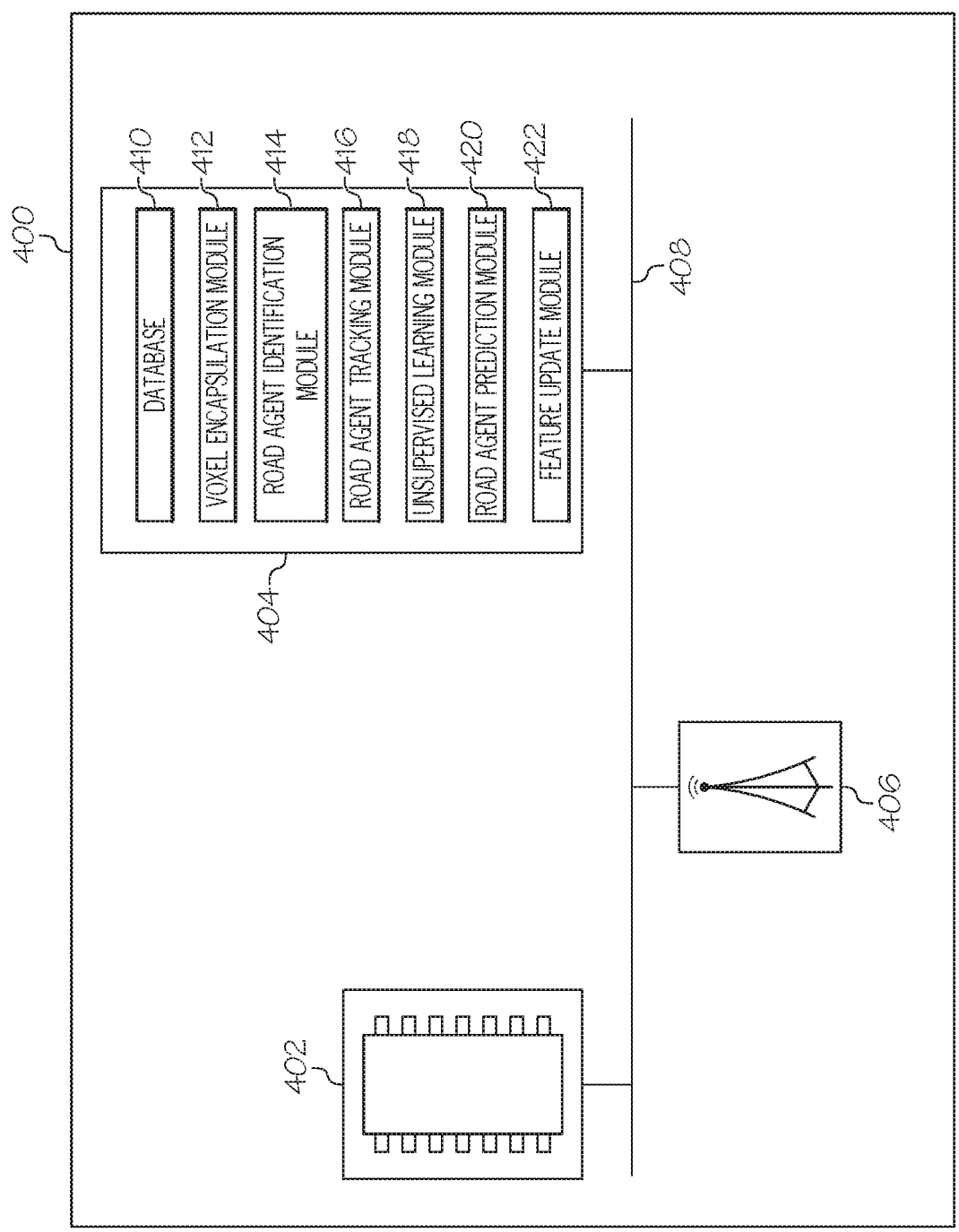
FIG. 4 depicts a schematic diagram of an example computing device for predicting road agent behavior using voxel grids with unsupervised learning techniques, according to one or more embodiments shown and described herein.

Referring now to FIG. 4, an alternative remote computing device 400 is shown that may be used in place of the remote computing device 104 in the system 100 of FIG. 1. The remote computing device 400 has one or more processors 402 similar to the one or more processors 302, memory modules 404 similar to the memory modules 304, network interface hardware 406 similar to the network interface hardware 306, and a communication path 408 similar to the communication path 308. However, the memory modules 404 of the remote computing device 400 are different than the memory modules 304 of the remote computing device 104. Specifically, the memory modules 404 comprise a database 410, a voxel encapsulation module 412, a road agent identification module 414, a road agent tracking module 416, an unsupervised learning module 418, a road agent prediction module 420, and a feature update module 422.

The remote computing device 400 may predict road agent behavior through unsupervised learning techniques, as disclosed herein. The remote computing device 400 may use voxel grids to represent states of a road portion, similar to the remote computing device 104 of FIG. 3. In the example of FIG. 4, a voxel grid may include a first set of feature layers (e.g., observed feature layers) comprising features that can be directly observed or determined using sensors data (e.g., positions and velocities of road agents), similar to the feature layers of FIG. 3. However, in the example of FIG. 4, the voxel grids used by the remote computing device 400 may also include a second set of feature layers that cannot be directly observed from sensor data (e.g., prediction feature layers). For example, the prediction feature layers may include features such as probabilities of road agents performing driving maneuvers. Different prediction feature layers may be associated with probabilities of different road agents performing different types of driving maneuvers. The features in the prediction feature layers may be learned using the techniques described herein.

Referring to FIG. 4, the database 410 may hold data received from the vehicle 102 and other vehicles and/or traffic infrastructures. The received data may comprise sensor data or other data that represents features of one or more road portions. In addition, as explained above, the database 410 may store other feature data related to road portions, such as probabilities of road agents performing various driving maneuvers, which may be included in the prediction feature layers for various voxel grids. These probabilities may comprise a joint likelihood of road agents performing various driving maneuvers given other features of a road portion. That is, given the observable features of a road portion (e.g., known locations and velocities of road agents on the road portion), a feature may comprise a probability that a particular road agent will perform a particular driving maneuver. For example, in the situation of FIG. 1 where the road portion comprises the vehicles 102, 110, the bicyclist 112, and the pedestrian 114 each heading in a certain direction at a certain velocity, probabilities may be determined of each of these road agents performing various driving maneuvers (e.g., turning, driving straight, changing lanes, etc.). These features can be encapsulated in a voxel grid and learned over time, using the unsupervised learning techniques described below. As these features are learned, they may be stored in the database 410.

Referring back to FIG. 4, the voxel encapsulation module 412 may encapsulate observed features into the observed feature layers of a voxel grid in a similar manner as the voxel encapsulation module 312, discussed above in connection with FIG. 3. This portion of a voxel grid may encapsulate a current state of a road portion. However, the voxel encapsulation module 412 may encapsulate additional features into voxels than the voxel encapsulation module 312. Namely, the voxel encapsulation module 412 may encapsulate feature relating to probabilities of road agents performing driving maneuvers into the prediction feature layers. In one example, the voxel encapsulation module 412 may retrieve the data to encapsulate into a voxel grid from the data stored in the database 410.

Referring still to FIG. 4, the road agent identification module 414 may identify one or more road agents for which data has been captured and received by the remote computing device 400 such that the road agents may be tracked by the road agent tracking module 416, as described below. In one example, this may comprise identifying that a particular road agent appears in multiple images taken at different times. In another example, this may comprise identifying a road agent from other sensor data received by the remote computing device 400 (e.g., road agents detected with Lidar). Once a particular road agent is identified from data received by the remote computing device 400, the road agent may be tracked using the road agent tracking module 416.

Referring still to FIG. 4, the road agent tracking module 416 may track the position of a road agent identified by the road agent identification module 414 over time. Specifically, the road agent tracking module 416 may track the position of an identified road agent over time. This may involve observing the position of the road agent in a plurality of voxel grids stored in the database 410. This may allow driving maneuvers of road agents to be detected, as explained in further detail below.

In addition to tracking the position of road agents, the road agent tracking module 416 may track other features of the road portion on which the road agent drives as the road agent's position changes. For example, the road agent tracking module 416 may track other features of voxel grids along with the position of a road agent. This may allow the movement of road agents to be tracked in conjunction with other features of the road portion (e.g., movement of other road agents), which may allow road agent behavior to be predicted based on various features of a road portion, as discussed below.

Referring still to FIG. 4, the unsupervised learning module 418 may utilize unsupervised learning techniques to learn to predict road agent behavior. In some examples, the unsupervised learning module 418 comprises a neural network. In other examples, other machine learning models for performing unsupervised learning may be used.

In one example, the unsupervised learning module 418 performs cluster analysis (e.g., K-means, Gaussian mixture model) to identify driving maneuvers performed by road agents. For example, the unsupervised learning module 418 may compare driving movements of various road agents, as detected by the road agent tracking module 416, and group the movements into clusters based on their similarity. Each cluster may represent a different driving maneuver performed by road agents. This may allow the unsupervised learning module 418 to detect driving maneuvers without human supervision or labelled training examples. For example, one cluster may represent a lane change, one cluster may represent a left turn, one cluster may represent a right turn, and some clusters may represent other maneuvers that may not be easily classifiable by humans.

In other examples, other types of unsupervised learning may be used to predict road agent behavior. For example, the unsupervised learning module 418 may analyze a series of voxel grid representing a time-sequence of states of a road portion and may generate a Markov chain that represents the data (e.g., probabilities of transitioning from one voxel grid to another).

By performing cluster analysis or other unsupervised learning techniques, the unsupervised learning module 418 may learn various driving maneuvers performed by road agents in various situations. Specifically, by analyzing a large amount of data collected by vehicles and/or traffic infrastructures, the unsupervised learning module 418 may learn the likelihood or probability of road agents performing various driving maneuvers based on observed voxel grid features (e.g., positions and velocities of other road agents). The unsupervised learning module 418 may store these learned probabilities of behavior in the database 410 along with the observed voxel grid features with which they are associated. Then, as discussed above, the voxel encapsulation module 412 may incorporate these learned probabilities into voxel grid feature layers. These learned probabilities may be used to predict future road agent behavior, as discussed below.

Referring still to FIG. 4, the road agent prediction module 420 may predict road agent behavior. Specifically, the remote computing device 400 may receive sensor data from the vehicle 102 as the vehicle 102 drives along the road 106 that represents features of the road 106 at the time the sensor data is recorded (e.g., positions and velocities of other road agents). The voxel encapsulation module 412 may encapsulate the observed features into the observed feature layers of a voxel grid. The observed feature layers encapsulated in the voxel grid may represent a current state of the road portion 101.

The road agent prediction module 420 may then compare the features representing the current state of the road portion 101 to the features stored in the database 410 for which probabilities of vehicle maneuvers are stored. The road agent prediction module 420 may then find one or more voxel grids stored in the database 410 that have observed feature values (e.g., values for the observed feature layers) closest to the feature set values received from the vehicle 102 (e.g., based on a squared error difference between feature values of the observed feature sets, or other functions to measure similarity between voxel grid values). The road agent prediction module 420 may then determine probabilities of road agents on the road portion 101 performing various driving maneuvers based on the probabilities stored in the prediction feature set layers of the one or more similar voxel grids. For example, if there is one stored voxel grid that has observed feature set values that are highly similar to the feature set values received from the vehicle 102, the road agent prediction module 420 may determine that the probabilities of the road agents on the road portion 101 performing various driving maneuvers are the same as the probabilities in the stored voxel grid. Alternatively, if there are multiple voxel grids that have observed feature set values that are somewhat similar to the feature set values received from the vehicle 102, the road agent prediction module 420 may combine the probabilities from those voxel grids to determine the probabilities of the road agents on the road portion 101 performing driving maneuvers.

After the road agent prediction module 420 determines the probabilities of road agents on the road portion 101 performing one or more driving maneuvers, those probabilities may be transmitted to the vehicle 102. The vehicle 102 may then adjust its driving behavior based on the received probabilities and associated predicted behavior of road agents. The vehicle sensors 210 on the vehicle 102 may then continue to capture data to monitor the road portion 101 and the behavior of the road agents. This data may continue to be sent to the remote computing device 400 and the feature update module 422 may compare the actual behavior of the road agents to the predicted behavior of the road agents. If the actual behavior of the road agents differs from the predicted behavior of the road agents, the feature update module 422 may update the appropriate prediction feature set values stored in the database 410 to make future predictions of road agent behavior more accurate.

Figure 5:
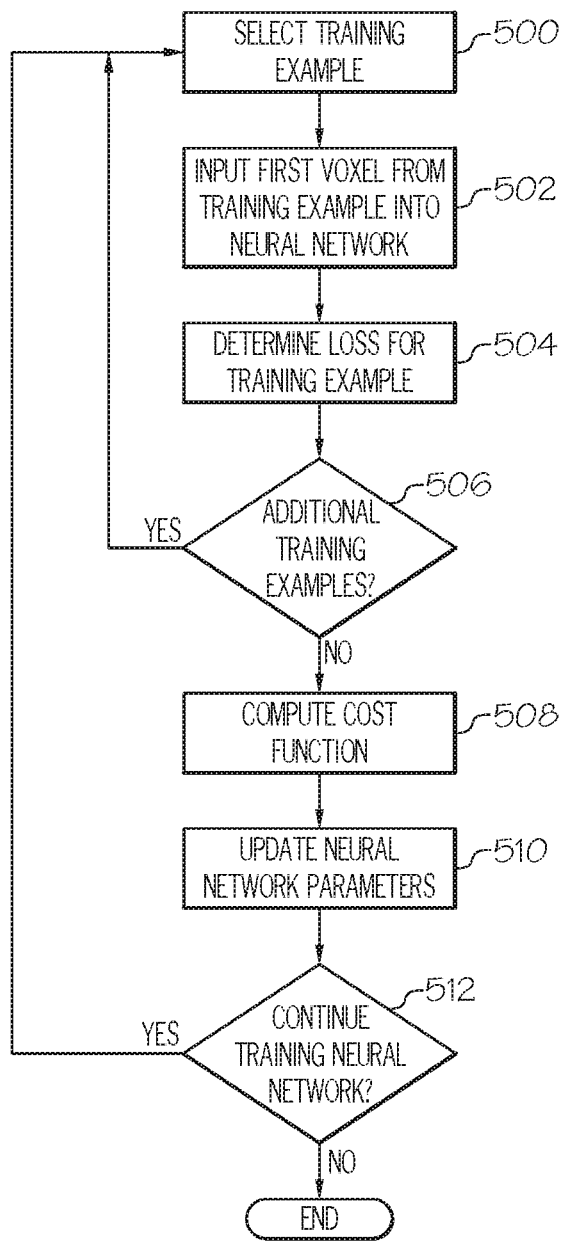
FIG. 5 depicts a flowchart of an example method for training a neural network to predict road agent behavior using voxel grids and supervised learning techniques, according to one or more embodiments shown and described herein.

FIG. 5 depicts a flowchart of an example method for training a neural network on the remote computing device 104 using supervised learning techniques. At step 500, the training data capture module 314 selects a training example. The training data capture module 314 may select a training example from among a plurality of training examples stored on the database 310. As explained above, a training example may comprise a first voxel grid encapsulating a state of a road portion at a first time, and a second voxel grid encapsulating a state of the road portion at a second later time.

At step 502, the neural network training module 316 inputs the first voxel grid from the selected training example into a neural network. The neural network may output a voxel grid representing a predicted future state of the road portion. Then, at step 504, the neural network training module 316 calculates a loss for the selected training example by comparing the second voxel grid of the selected training example to the output of the neural network.

At step 506, the neural network training module 316 determines whether additional training examples are to be used to train the neural network (e.g., whether all training examples of a training set have been passed through the neural network). If the neural network training module 316 determines that additional training examples are to be used (Yes at step 506), then control returns to step 500 and another training example is selected. If the neural network training module 316 determines that no additional training examples are to be used (No at step 506), then, at step 508, the neural network training module 316 calculates the value of a cost function based on the losses calculated for all of the selected training examples. At step 510, the neural network training module 316 updates the neural network parameters to minimize the cost function (e.g., using gradient descent or another optimization algorithm).

At step 512, the neural network training module 316 determines whether to continue training the neural network. For example, the neural network training module 316 may determine whether the value of the cost function is below a certain level, or whether a specified number of passes through the neural network have occurred. If the neural network training module 316 determines that the neural network should continue to be trained (Yes at step 512), control returns to step 500 and another pass is made through the neural network using all the training examples. If the neural network training module 316 determines that the neural network should not continue to be trained (No at step 512), the example of FIG. 5 ends.

Figure 6:
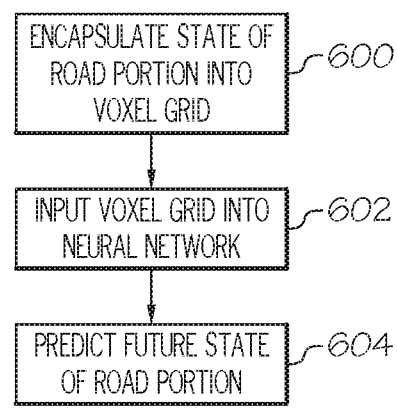
FIG. 6 depicts a flowchart of an example method for predicting road agent behavior using a neural network trained using supervised learning techniques, according to one or more embodiments shown and described herein.

FIG. 6 depicts a flowchart of an example method for predicting road agent behavior using the remote computing device 104, according to one or more embodiments shown and described herein. The method of FIG. 6 may be performed by the remote computing device 104. At step 600, the voxel encapsulation module 312 encapsulates a current state of a road portion into voxel grid.

At step 602, the road agent prediction module 318 inputs the voxel grid representing the current state into a trained neural network. The parameters of the neural network may be stored in the database 310. The neural network may output a voxel grid that represents a predicted future state of the road portion. Thus, at step 604, the road agent prediction module 318 predicts a future state of the road portion based on the output of the neural network. The remote computing device 104 may then transmit the voxel grid representing the predicted future state of the road portion to the vehicle 102.

Figure 7:
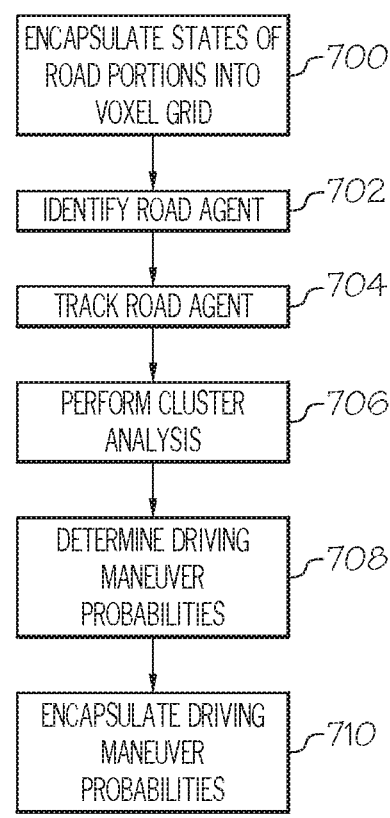
FIG. 7 depicts a flowchart of an example method for training a neural network to predict road agent behavior using voxel grids and unsupervised learning techniques, according to one or more embodiments shown and described herein.

FIG. 7 depicts a flowchart of an example method for training a neural network or other machine learning model on the remote computing device 400 using unsupervised learning techniques. At step 700, the voxel encapsulation module 412 encapsulates one or more observed features of one or more road portions into the observed feature layers of voxel grids. At step 702, the road agent identification module 414 identifies one or more road agents from the voxel grids encapsulated by the voxel encapsulation module 412.

At step 704, the road agent tracking module 416 tracks one or more road agents identified by the road agent identification module 414. Then, at step 706, the unsupervised learning module 418 performs cluster analysis on the one or more road agents tracked by the road agent tracking module 416.

At step 708, the unsupervised learning module 418 determines probabilities of road agents performing one or more driving maneuvers based on the cluster analysis. Then, at step 710, the feature update module 422 encapsulates the determined driving maneuver probabilities into the prediction feature layers for the appropriate voxel grids. These fully encapsulated voxel grids may be stored in the database 410.

Figure 8:
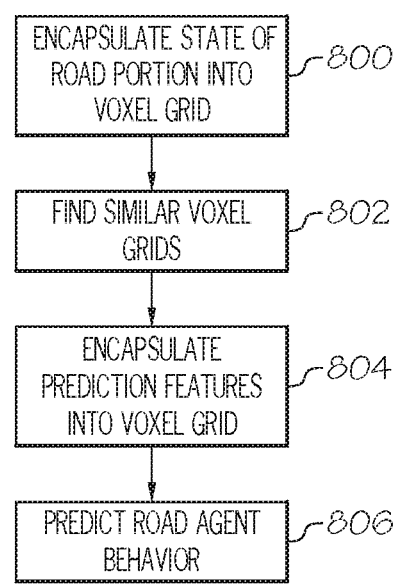
FIG. 8 depicts a flowchart of an example method for predicting road agent behavior using a neural network trained using unsupervised learning techniques, according to one or more embodiments shown and described herein.

FIG. 8 depicts a flowchart of an example method for predicting road agent behavior using the remote computing device 400. At step 800, the road agent prediction module 420 encapsulates features and/or sensor data received from the vehicle 102 representing a current state of a road portion into the observed feature layers of a voxel grid. At step 802, the road agent prediction module 420 identifies one or more voxel grids stored in the database 410 that have feature values in the observed feature layers similar to the feature values in the observed feature layers representing the current state of the road portion observed by the vehicle 102.

At step 804, the road agent prediction module 420 encapsulates features into the prediction feature layers of the voxel grid based on the prediction feature layers from the identified similar voxel grids. At step 806, the road agent prediction module 420 predicts road agent behavior based on the fully encapsulated voxel grid.

It should be understood that embodiments described herein are directed to predicting road agent behavior using voxel grids. A state of a road portion may be encapsulated into a voxel grid representing observed features at a particular time. Other features representing probabilities of road agents performing driving maneuvers may also be encapsulated into the voxel grid.

A neural network or other machine learning model may be trained to predict future states of a road portion and/or probabilities of road agents performing driving maneuvers using supervised or unsupervised learning techniques. Using supervised learning techniques, a neural network may be trained to predict a voxel grid representing a future state of a road portion based on a voxel grid representing a current state of a road portion. Using unsupervised learning techniques, a neural network may be trained to predict probabilities of road agents performing various driving maneuvers using cluster analysis.

After a neural network is trained, an autonomous vehicle may observe a state of a road portion and transmit the observed state to a remote computing device. The remote computing device may encapsulate the observed state into a voxel grid and input the voxel grid into a trained neural network. The neural network may output a voxel grid representing a predicted future state of the voxel grid and/or probabilities of road agents performing various driving maneuvers. The output of the neural network may be transmitted from the remote computing device to the autonomous vehicle. The autonomous vehicle may then adjust its driving behavior based on the predictions output by the neural network.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
   encapsulating a current state of a road portion into a voxel grid, a first dimension of the voxel grid being associated with a first spatial dimension of the road portion, a second dimension of the voxel grid being associated with a second spatial dimension of the road portion, and a third dimension of the voxel grid comprising a plurality of feature layers, wherein each feature layer is associated with a feature of the road portion;
   inputting the voxel grid into a trained neural network;
   predicting a future state of the road portion based on an output of the neural network; and
   causing a vehicle to perform self-driving maneuvers based on the predicted future state of the road portion.

2. The method of claim 1, wherein at least one feature layer is associated with whether a section of the road portion is occupied by a road agent.

3. The method of claim 1, wherein at least one feature layer is associated with a velocity of a road agent.

4. The method of claim 1, wherein at least one feature layer is associated with a direction of travel of a road agent.

5. The method of claim 1, wherein at least one feature layer is associated with a state of a traffic infrastructure.

6. The method of claim 1, wherein at least one feature layer is associated with whether an occlusion is present.

7. The method of claim 1, wherein at least one feature layer comprises a semantic class of road agents.

8. The method of claim 1, further comprising inputting are image of the road portion into the trained neural network.

9. The method of claim 1, further comprising training the neural network using training data comprising a plurality of training examples, wherein each training example comprises:
   an input layer comprising a first voxel grid representing a state of a road portion at a first time; and
   a ground truth label comprising a second voxel grid representing a state of the road portion at a second time after the first time,
   wherein the neural network is trained to minimize a cost function comprising a combination of loss functions associated with each training example, wherein a loss function associated with a training example is based on a difference between the ground truth label for the training example and an output layer of the neural network when the input layer for the training example is input to the neural network.

10. The method of claim 1, wherein at least one feature layer is associated with a probability that a section of the road portion is occupied by a road agent.

11. The method of claim 1, wherein at least one feature layer is associated with a probability that a road agent will execute a driving maneuver.

12. The method of claim 11, wherein the driving maneuver comprises performing a lane change.

13. The method of claim 11, wherein the driving maneuver comprises executing a turn.

14. The method of claim 1, further comprising training the neural network using unsupervised learning techniques.

15. The method of claim 14, further comprising training the neural network by tracking movement of a plurality of road agents and performing cluster analysis based on the movement of the road agents.

16. The method of claim 15, further comprising determining a probability of a road agent performing a driving maneuver based on the cluster analysis.

17. An apparatus comprising:
   one or more processors;
   one or more memory modules; and
   machine readable instructions stored in the one or more memory modules that, when executed by the one or more processors, cause the apparatus to:
      encapsulate a current state of a road portion into a voxel grid, a first dimension of the voxel grid being associated with a first spatial dimension of the road portion, a second dimension of the voxel grid being associated with a second spatial dimension of the road portion, and a third dimension of the voxel grid comprising a plurality of feature layers, wherein each feature layer is associated with a feature of the road portion;
      input the voxel grid into a trained neural network;

predict a future state of the road portion based on an output of the neural network; and cause a vehicle to perform self-driving maneuvers based on the predicted future state of the road portion.

18. The apparatus of claim 17, wherein the machine readable instructions stored in the one or more memory modules, when executed by the one or more processors, cause the apparatus to train the neural network using training data comprising a plurality of training examples, wherein each training example comprises:

an input layer comprising a first voxel grid representing a state of a road portion at a first time; and a ground truth label comprising a second voxel grid representing a state of the road portion at a second time after the first time, wherein the neural network is trained to minimize a cost function comprising a combination of loss functions associated with each training example, wherein a loss function associated with a training example is based on a difference between the ground truth label for the training example and an output layer of the neural network when the input layer for the training example is input to the neural network.

19. The apparatus of claim 17, wherein the machine readable instructions stored in the one or more memory modules, when executed by the one or more processors, cause the apparatus to train the neural network by tracking movement of a plurality of road agents and performing cluster analysis based on the movement of the road agents.

20. The apparatus of claim 19, wherein the machine readable instructions stored in the one or more memory modules, when executed by the one or more processors; cause the apparatus to determine a probability of a road agent performing a driving maneuver based on the cluster analysis.

* * * * *